(12) United States Patent
Izumi (10) Patent No.: US 8,234,342 B2
(45) Date of Patent: Jul. 31, 2012

(54) CHAT SYSTEM, CHAT DEVICE AND CONTROL METHOD OF CHAT SERVER, AND INFORMATION STORAGE MEDIUM FOR ADVANCING AN END TIMING OF A MESSAGE RECEPTION STOPPING PERIOD

(75) Inventor: Tadakatsu Izumi, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 990 days.

(21) Appl. No.: 12/162,563

(22) PCT Filed: Dec. 15, 2006

(86) PCT No.: PCT/JP2006/325104
§ 371 (c)(1),
(2), (4) Date: Jul. 29, 2008

(87) PCT Pub. No.: WO2007/088679
PCT Pub. Date: Aug. 9, 2007

(65) Prior Publication Data
US 2009/0031223 A1 Jan. 29, 2009

(30) Foreign Application Priority Data
Jan. 31, 2006 (JP) .................... 2006-023398

(51) Int. Cl.
*G06F 15/16* (2006.01)
(52) U.S. Cl. .................... 709/206; 709/203; 709/201
(58) Field of Classification Search .................. 709/201, 709/203, 206
See application file for complete search history.

(56) References Cited

U.S. PATENT DOCUMENTS
6,799,199 B1 9/2004 Segal et al.
7,496,631 B2 2/2009 Austin-Lane et al.
(Continued)

FOREIGN PATENT DOCUMENTS
EP 1 640 047 A1 3/2006
(Continued)

OTHER PUBLICATIONS

Schulzrinne Columbia U H: "Indication of Message Composition for Instant Messaging rfc3994.txt", IETF Standard, Internet Engineering Task Force, IETF, CH; Jan. 1, 2005, p. 8-13.

(Continued)

*Primary Examiner* — Djenane Bayard
(74) *Attorney, Agent, or Firm* — Sughrue Mion, PLLC (57) ABSTRACT

Provided are a chat system for achieving good communication among users, a control method for a chat device and devices in a chat server, and an information storage medium. A message transfer unit (11*a*) transfers a message to a transmission destination game terminal upon receipt of the message, and a stop restriction unit (11*e*) transmits an instruction to restrict chat function stop processing to a transmission source game terminal. Also, a stop restricting time calculation unit (11*b*) calculates a stop restricting time T depending on the count of characters in the message, and a timer unit (11*d*) activates a timer to measure an elapsed time E. When the elapsed time E reaches or exceeds the stop restricting time T, the stop restriction unit (11*e*) transmits an instruction to release the restriction of the chat function stop processing to the transmission source game terminal. Further, an advanced time calculating unit (11*c*) calculates an advanced stop restricting time T–t upon receiving the message directed to the game terminal before the elapsed time E reaches or exceeds the stop restricting time T.

14 Claims, 7 Drawing Sheets

U.S. PATENT DOCUMENTS

| | | |
|---|---|---|
| 2002/0083179 A1 | 6/2002 | Shaw et al. |
| 2002/0156854 A1 | 10/2002 | Matsumoto |
| 2003/0060285 A1 | 3/2003 | Itakura |
| 2003/0154251 A1 | 8/2003 | Manabe et al. |
| 2004/0087371 A1 | 5/2004 | Yamana et al. |
| 2004/0087372 A1 | 5/2004 | Yamana et al. |
| 2004/0109023 A1 | 6/2004 | Tsuchiya |
| 2004/0153557 A1 | 8/2004 | Shochet et al. |
| 2004/0179039 A1 | 9/2004 | Blattner et al. |
| 2005/0027676 A1 | 2/2005 | Eichstaedt et al. |
| 2005/0132011 A1 | 6/2005 | Muller et al. |
| 2005/0149622 A1 | 7/2005 | Kirkland et al. |
| 2005/0267942 A1 | 12/2005 | Quinn et al. |
| 2009/0100141 A1 | 4/2009 | Kirkland et al. |

FOREIGN PATENT DOCUMENTS

| | | |
|---|---|---|
| JP | 2001-195319 A | 7/2001 |
| JP | 2001-195319 A | 7/2001 |
| JP | 2001-198363 A | 7/2001 |
| JP | 2002-85850 A | 3/2002 |
| JP | 2002-319975 A | 10/2002 |
| JP | 2003-62350 A | 3/2003 |
| JP | 2003-164669 A | 6/2003 |
| JP | 2003-290549 A | 10/2003 |
| JP | 2004267433 A | 9/2004 |
| JP | 2004-350910 A | 12/2004 |
| JP | 2005-94385 A | 4/2005 |
| JP | 2005-267347 A | 9/2005 |
| JP | 3924101 B2 | 3/2007 |
| KR | 2003-0079370 A | 10/2003 |
| KR | 10-2005-0099909 A | 10/2005 |
| TW | 592759 | 6/2004 |

OTHER PUBLICATIONS

Taiwan Search Report and Partial Translation; dated May 14, 2009.
Supplementary European Search Report dated Apr. 23, 2009.
"Final Fantasy XI Zlart no Gen'ei Playing Manual, Square Enix", Mar. 31, 2005, pp. 20, 99.
"Kyosei Shuryo Penalty System Donyu!", [online], Gamepot Inc., Mar. 22, 2005, [retrieval date Feb. 27, 2007, Internet <URL:http://www.pangya.jp/050322penalty/>.
H. Schulzrinne, "Indication of Message Composition for Instant Messaging," IETF Standard, Internet Engineering Task Force, Columbia University, Abstract , p. 2, line 1-p. 8, line 9, 2005.

CHAT SYSTEM, CHAT DEVICE AND CONTROL METHOD OF CHAT SERVER, AND INFORMATION STORAGE MEDIUM FOR ADVANCING AN END TIMING OF A MESSAGE RECEPTION STOPPING PERIOD

TECHNICAL FIELD

The present invention relates to a chat system for transferring and receiving messages between chat devices, a control method for a chat device and a chat server, and an information storage medium.

BACKGROUND ART

Up to now, messages have been transmitted/received between chat devices to perform communication (chat) in real time. In particular, in an online game, it is common to equip each game terminal with a chat function in order to make the game more exciting, and various ideas are used for promoting communication between users. Patent Document 1 introduces a game device (chat device) which optimizes a time for displaying a message in accordance with the count of characters in the inputted message.

Patent Document 1: JP 2003-290549 A

DISCLOSURE OF THE INVENTION

Problems to be Solved by the Invention

However, according to the above chat device, a user of each chat device can stop chatting at any time, so if, for example, the user stops chatting immediately after posting a message, another user cannot be provided with a chance to reply, which leads to an inequality between users.

One of various possible measures against this is to prohibit a user who has posted a message from stopping the chat function for a given period of time. The given period may be a fixed period of time or may be determined in accordance with the size of the user's message. This secures a user who receives a message a chance to reply, and reduces the inequality mentioned above.

In the case where the above measure is taken, the restriction of the stopping of the chat function is not released until after the given period has passed, and there is a possibility that the chat function cannot be stopped even after a reply message is received from the original message recipient user, which may be an unduly long-term restriction of the stopping of the chat function.

It might be possible to cause the restriction of the stopping of the chat function to be released upon receipt of a reply message without waiting for the expiration of the given period.

However, releasing the restriction of the stopping of the chat function upon the receipt of a reply message may not ultimately reduce the inequality in such cases where the original message recipient user accidentally transmits an unfinished reply message and the original message sender user stops the chat function before the original message recipient user transmits anew a finished reply message.

The present invention has been made in view of the above problem, and an object of the present invention is therefore to provide a chat system for accomplishing good communication between users, a control method for a chat device and a chat server, and an information storage medium.

Means for Solving the Problems

In order to solve the above-mentioned problem, according to the present invention, there is provided a chat system including a first chat device and a second chat device each including: message input means through which a user inputs a message; message transmission means which transmits a message input through the message input means; message reception means which receives a message; message output means which outputs the message received by the message reception means; and message reception/output stop means which stops the message reception and output by the message reception means and the message output means in response to a given operation by the user. The chat system includes: chat stop restricting time calculation means which calculates a chat stop restricting time based on contents of a message that is transmitted from the message transmission means in the first chat device; stop restriction means which restricts the message reception/output stop means from stopping the message reception and output in the first chat device in response to the user's given operation for a period corresponding to the calculated chat stop restricting time; and end timing advancing means which, when the second chat device transmits a message directed to the first chat device during the period, advances an end timing of the period based on the contents of the message.

The present invention allows the first chat device and the second chat device to input/output a message and to transmit/receive messages between the chat devices. The present invention also makes it possible to stop the reception and output of messages in each chat device in response to a given operation of the user of the chat device. Furthermore, the stop of the reception and output of messages in the first chat device in response to a given operation of the user can be restricted for a time period corresponding to a chat stop restricting time, which is calculated based on the contents of a message transmitted from the first chat device. If the first chat device receives a message, in other words, the second chat device transmits a message, during this period, the end timing of the period can be advanced in accordance with the contents of the message. This prevents the restriction put on a user's freedom to stop the chat function after the user transmits a message from lasting unduly long, thereby appropriately securing a user who receives the message a chance to transmit a reply message, and making communication between the users good. Note that the chat stop restricting time is calculated based on the contents of a message transmitted from the first chat device. The chat stop restricting time may be calculated, for example, based on the character count of the message or the time required to input the message. The end timing is advanced in accordance with the contents of the message directed to the first chat device, and how much the end timing is to be advanced may be calculated from, for example, the character count of the message or the time required to input the message.

According to an aspect of the present invention, this chat system may further include timer means which measures the passage of the period. In this aspect, the passage of the period can be measured accurately, so that the reception and output of messages in the first chat device can be restricted from being stopped for the length of the period.

According to an aspect of the present invention, the stop restriction means, the chat stop restricting time calculation means, and the end timing advancing means may be provided in each of the first chat device and the second chat device, or may be provided in a chat server.

According to an aspect of the present invention, the first chat device and the second chat device may be video game terminals and the chat server may be a video game server.

Further, according to the present invention, a method of controlling chat devices includes the steps of: inputting a message; transmitting the input message; receiving a message; outputting the received message; stopping the message reception and output in response to a given operation by a user; calculating a chat stop restricting time based on contents of a transmitted message; restricting the message reception and output from being stopped in response to the user's given operation for a period corresponding to the calculated chat stop restricting time; and when a message is received during the period, advancing an end timing of the period based on the contents of the message.

Further, an information storage medium according to the present invention is a computer-readable information storage medium storing a program which causes a computer to function as: message input means through which a message is input; message transmission means which transmits the input message; message reception means which receives a message; message output means which outputs the received message; message reception/output stop means which stops the message reception and output in response to a given operation by a user; chat stop restricting time calculation means which calculates a chat stop restricting time based on contents of a message that is transmitted by the message transmission means; stop restriction means which restricts the message reception/output stop means from stopping the message reception and output in response to a given user's operation for a period corresponding to the calculated chat stop restricting time; and end timing advancing means which, when a message is received during the period, advances an end timing of the period based on the contents of the message.

The present invention makes it possible for each chat device to restrict the reception and output of messages in the chat device from being stopped. The present invention also makes it possible to advance the end timing of the period corresponding to the chat stop restricting time in each chat device.

Further, according to the present invention, a method of controlling a chat server for use in a chat system including a first chat device and a second chat device includes the steps of: receiving a message that is transmitted from the first chat device; transferring the received message to the second chat device; receiving a message that is transmitted from the second chat device; transferring the received message to the first chat device; calculating a chat stop restricting time based on contents of a message that is transmitted from the first chat device; restricting the first chat device from stopping the message reception and output for a period corresponding to the calculated chat stop restricting time; and when a message directed to the first chat device is received during the period, advancing an end timing of the period based on the contents of the message.

Further, an information storage medium according to the present invention is a computer-readable information storage medium storing a program which causes a computer for use in a chat system including a first computer and a second computer to function as: message reception means which receives messages transmitted from the first computer and the second computer; message transfer means which transfers a message transmitted from the first computer to the second computer and transfers a message transmitted from the second computer to the first computer; chat stop restricting time calculation means which calculates a chat stop restricting time based on contents of a message that is transmitted from the first computer; stop restriction means which restricts the reception and output of messages from being stopped in the first computer for a period corresponding to the calculated chat stop restricting time; and end timing advancing means which, when a message directed to the first computer is received during the period, advances an end timing of the period based on the contents of the message.

According to the present invention, the chat server can restrict each chat device from stopping the message reception and output. The chat server can also advance the end time of a period during which the reception and output of messages in the respective chat devices are restricted from being stopped. This reduces processing executed in each chat device and lightens the load on each chat device.

BEST MODE FOR CARRYING OUT THE INVENTION

An embodiment (Embodiment 1) of the present invention will be described below in detail with reference to the drawings.

Figure 1:
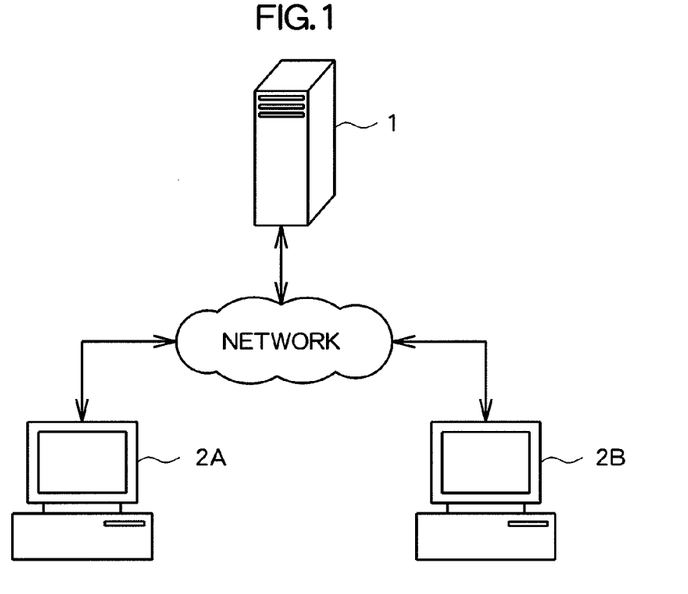
FIG. 1 is a diagram showing an example of the overall configuration of a chat system according to an embodiment of the present invention.

FIG. 1 is a diagram showing the overall configuration of a chat system according to an embodiment of the present invention. As shown in FIG. 1, this chat system includes a game server 1 and game terminals 2A and 2B. The game server 1 and the game terminals 2 can communicate with one another via a network. In the following description, the game terminals 2A and 2B will be referred to as "game terminal 2" if there is no need for particular distinction between them.

The game server 1 is a known server computer mainly including a microprocessor, various storage devices, and a data communication device, and serves to manage and relay a chat performed between the game terminals 2. The game terminals 2A and 2B are known computers such as household game machines, arcade game machines, personal computers, cell phones, and personal digital assistant, which mainly includes a monitor, input means such as a keyboard, and a controller, a processor, various storage devices, and a data communication device. The game terminals 2A and 2B are used by users to perform a chat (conversation performed by exchanging message character strings).

Figure 2:
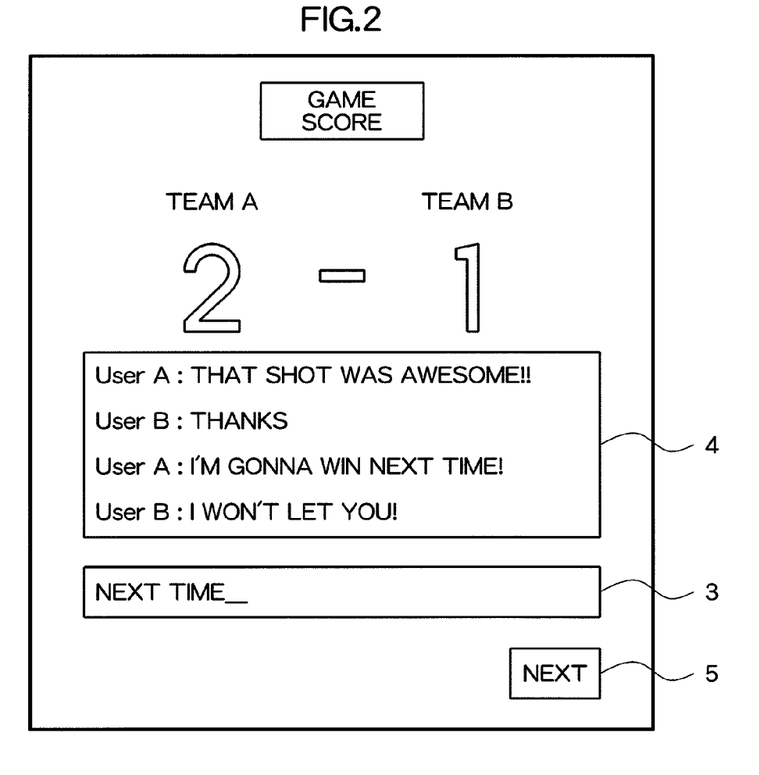
FIG. 2 is a diagram showing an example of a chat window.

FIG. 2 shows an example of a chat window that is displayed on the monitor of the game terminal 2A in a multi-player online game. The same window is also displayed on the game terminal 2B. The example shown herein is a chat window for a chat performed in a state in which a match result is displayed after a soccer match has ended. As shown in FIG. 2, a message input field 3 is placed in a lower part of the window, and a chat log field 4 is placed above the message input field 3. A user A of the game terminal 2A (hereinafter, the user of the game terminal 2A is referred to as user A whereas the user of the terminal 2B is referred to as user B) inputs a message in the message input field 3 and executes an enter operation, such as clicking on a not-shown "transmit" button, to enter the message. When the user A enters the message, the message is output and displayed in combination with the user ID of the user A (here, "User A") in the chat log field 4 as a post by the user A. At this point, the message is similarly output and displayed in the chat log field 4 of the chat window displayed on the game terminal 2B, and the user B inputs and transfers a message in response to the displayed message. The users A and B thus chat with each other by inputting messages to their respective message input fields 3 while looking at their own chat log fields 4, thereby having a conversation about, for example, the highlights of the game. Specifically, a message input in one game terminal 2 is, after an enter operation is executed, transmitted to the game server 1 along with information such as identification data (e.g., user ID) of a chat partner user. The game server 1, which stores in advance identification data of each user in association with the network address of the game terminal 2 of the user, transfers the message to a network address that is associated with the transmitted identification data, namely, the game terminal 2 of the chat partner user. The game terminal 2 of the chat partner user receives the message, and outputs and displays the message in its chat log field 4.

When the user executes a chat stop operation in the window shown in FIG. 2, such as clicking on a button 5 labeled "next" placed at the lower right the drawings, the chat function is stopped (terminated). The game terminal 2 whose chat function has been stopped (terminated) cannot receive messages transferred from other game terminals 2 to this game terminal 2. A different window from the chat window may be displayed in this state. The button 5 can take any form as long as it is a chat function stop instructing image for giving an instruction to stop the chat function. The button 5 in FIG. 2 is a rectangular image labeled with a character string "next" as an example of the chat function stop instructing image.

This game server 1 includes a known timer, and stores a time at which a message transferred from one game terminal 2 is received in a storage device such as RAM. The game server 1 also calculates a stop restricting time T based on a content of the received message. Here, the character count of the message is counted and the calculation of the stop restricting time T corresponding to the character count is based on a given calculation formula or the like. The stop restricting time T is a length of a time period during which the game server 1 restricts the stopping of the chat function through the chat stop operation described above. Specifically, for the period, the game server 1 changes the display mode of the button 5 shown in FIG. 2 in a manner that makes it impossible for the user to click on the button 5, or invalidates processing that is executed when the button 5 is clicked on. Examples of the display mode change include displaying the button 5 translucently, erasing the button 5 completely, and displaying the button 5 in a smaller size. In short, the game server 1 restricts the stopping of the chat function through the chat stop operation over the period by making it impossible for the user of the game terminal 2 to execute the chat stop operation or by invalidating processing that is executed through the chat stop operation. The stop restricting time may be a time having a preset given length regardless of the character count of the message.

The game server 1 thus transfers a message received from one game terminal 2 to a partner user's game terminal 2 while simultaneously recording the reception time of the message and calculating the stop restricting time T based on the character count of the message. The message reception time is used as the start time of the above period, and the stopping of the chat function through the chat stop operation is restricted in the game terminal 2 that has transmitted the message until the stop restricting time T passes. In other words, the game server 1 prevents a user from stopping (terminating) the chat function of their game terminal 2 immediately after transmitting a message.

If the game terminal 2 that has transmitted a message receives a message directed to this game terminal 2 during a period in which the stopping of the chat function is restricted, the game server 1 advances the end timing of the period in accordance with the contents of the message. The game server 1 calculates an advancing time t based on the counted character count of the message and the use of a given calculation formula. The game server 1 subtracts the advancing time t from the stop restricting time T, thereby updating the value of the stop restricting time T to an advanced stop restricting time T−t. The game server 1 restricts the stopping of the chat function in this game terminal 2 from the start time of the above period until the advanced stop restricting time T−t elapses. In other words, the game server 1 cuts short the period in which the stopping of the chat function is restricted by advancing the end timing of this period by the advancing time t.

The above enables this chat system to prevent the restriction put on a user's freedom to stop the chat function after the user transmits a message from lasting unduly long, while appropriately securing a user who receives the message a chance to transmit a reply message. As a result, communication between users is made good.

The following is a more detailed description on the configuration and operation of this system.

Figure 3:
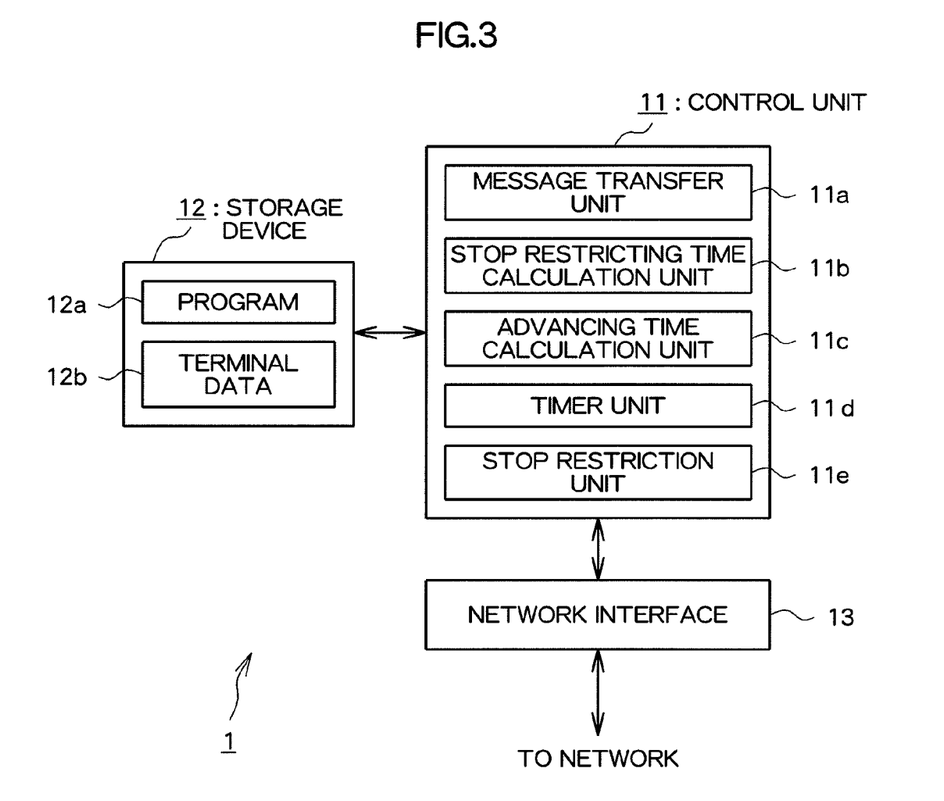
FIG. 3 is a configuration/functional block diagram of a game server according to Embodiment 1 of the present invention.

FIG. 3 is a configuration/functional block diagram of the game server 1. As shown in FIG. 3, the game server 1 includes a control unit 11, a storage device 12, and a network interface 13. The game server 1 may also include a not-shown input/output unit such as a keyboard, a monitor, a DVD player, and the like, and a not-shown information storage medium such as a DVD-ROM or a CD-ROM. The control unit 11 includes functional blocks which are a message transfer unit 11a, a stop restricting time calculation unit 11b, an advancing time calculation unit 11c, a timer unit 11d, and a stop restriction unit 11e. These functional blocks are realized by a given program 12a stored in the storage device 12 being executed on the game server 1. The program 12a may be stored in the computer-readable storage medium mentioned above, such as a DVD-ROM or a CD-ROM.

The control unit 11 including, for example a known CPU receives a message from one game terminal 2, and also identifies the transferring destination of the message, and transfers the message to the identified game terminal 2. The control unit 11 also counts the character count of the received message, and calculates the stop restricting time T or the advancing time t in accordance with the character count. The control unit 11 then restricts the stopping of the chat function through the chat stop operation in the game terminal 2 that has transmitted the message. As mentioned above, the control unit 11 includes functions which are the message transfer unit 11a, the stop restricting time calculation unit 11b, the advancing time calculation unit 11c, the timer unit 11d, and the stop restriction unit 11e. Specific processing of these units will be described later.

Figure 4:
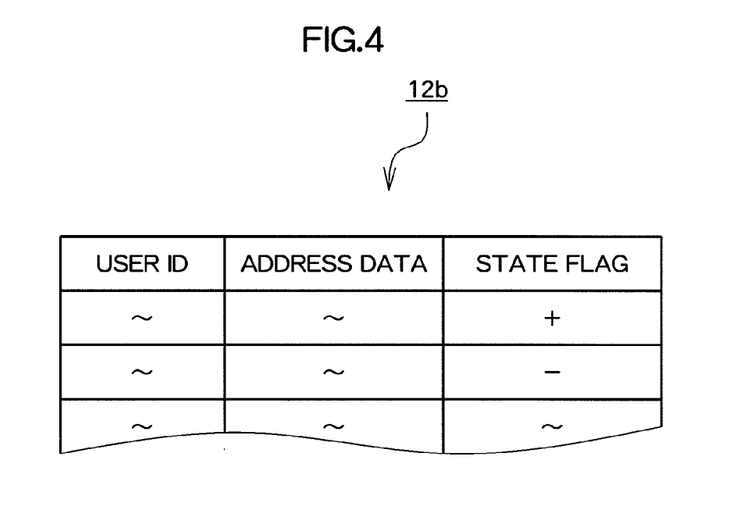
FIG. 4 is a diagram showing an example of a table where a user ID, address data, and a state flag are stored in association with one another.

The storage device 12 includes a known memory such as RAM. The storage device 12 stores the program 12a, which is output to the control unit 11. The storage device 12 also stores terminal data 12b. The terminal data 12b is a table shown in FIG. 4, and holds in association with one another a user ID, which is obtained by a known art at the start of a chat, address data such as the IP address of the game terminal 2 that is associated with the user ID, and a state flag, which indicates whether or not the stopping of the chat function in the game terminal 2 is restricted. A state flag "+" indicates that the stopping of the chat function is being restricted, whereas a state flag "−" indicates that the stopping of the chat function is not being restricted.

The network interface 13 is a communication device, for example, a known network card. The network interface 13 transmits and receives data over a network.

Now, specific processing of the respective units of the control unit 11 will be described.

The message transfer unit 11a mainly includes a known CPU. The message transfer unit 11a is realized by execution of the program 12a. The message transfer unit 11a receives a message and the user ID of a chat partner (the user B) from the game terminal 2A through the network interface 13. The message transfer unit 11a then refers to the terminal data 12b of FIG. 4 and transfers the message to an address indicated by the address data that is associated with the received user ID, namely, the game terminal 2B. The message transfer unit 11a similarly receives a message and the user ID of the user A from the game terminal 2B, and transfers the message to the game terminal 2A. The following description takes as an example a case in which the user A first transmits a message to the user B and then the user B transmits a reply message regarding this message to the user A.

The stop restricting time calculation unit 11b mainly includes a known CPU. The stop restricting time calculation unit 11b is realized by execution of the program 12a. The stop restricting time calculation unit 11b counts the character count of the message received by the message transfer unit 11a, and calculates the stop restricting time T based on the message's character count. For example, the stop restricting time T may be a value obtained by multiplying the message character count by a given coefficient. If the given coefficient is 1 and the message character count is 100 in this example, the stop restricting time T is 1×100=100 seconds. Alternatively, the stop restricting time T may be a preset given value.

When a message directed to the game terminal 2A is received from the game terminal 2B during the period in which the stopping of the chat function is restricted, the advancing time calculation unit 11c calculates the advancing time t by which the end timing of the above period is advanced. Specifically, when the message transfer unit 11a receives the message from the game terminal 2B, the terminal data 12b is referred to in order to judge from a state flag that is associated with the user ID of the destination of the transmitted message (the user ID of the user A) whether or not the transmission destination game terminal 2A is in the above period. Judging that the game terminal 2A is in the period, the advancing time calculation unit 11c calculates the advancing time t. For example, the advancing time t may be a value obtained by multiplying the message character count by a given coefficient as in the calculation of the stop restricting time T, or may be a preset given value.

The timer unit 11d mainly includes a known CPU and a timer. The timer unit 11d is realized by execution of the program 12a. The timer unit 11d measures the passage of a period in which the game terminal 2A is restricted from stopping the chat function in the game terminal 2A. Specifically, in the game terminal 2A during a period in which the game terminal 2A is restricted from stopping the chat function, the timer unit 11d obtains the start time (the message reception time) of this period and measures an elapsed time E since the start time.

The stop restriction unit 11e mainly includes a known CPU. The stop restriction unit 11e is realized by execution of the program 12a. The stop restriction unit 11e restricts stopping of the chat function by the chat stop operation of the user A in the user terminal 2A for a period that corresponds to the stop restricting time T calculated by the stop restricting time calculation unit 11b. When the message transfer unit 11a receives a message from the game terminal 2A, the stop restriction unit 11e transmits various restriction instructions for restricting the user A from executing the chat stop operation to the game terminal 2A. For example, the stop restriction unit 11e transmits instructions for making it impossible to click on the button 5 in FIG. 2 by turning the button 5 translucent or by making the button 5 disappear, or the stop restriction unit 11e transmits instructions to invalidate processing that is executed by clicking on the button 5 while leaving the button 5 in a clickable state. In short, the stop restriction unit 11e transmits instructions for restricting the user A from stopping the message reception and the output in the game terminal 2A through the chat stop operation. The transmission of the restriction instructions is accompanied with an update of the state flag in the terminal data 12b to "+". When the elapsed time E becomes equal to or longer than the stop restricting time T, the stop restriction unit 11e transmits a restriction release instruction which instructs cancellation of the above restriction instructions to the game terminal 2A. The restriction release instruction is similarly transmitted to the game terminal 2A when the elapsed time E becomes equal to or longer than the advanced stop restricting time T−t in the case where the message transfer unit 11a receives a message directed to the game terminal 2A during a period in which the stopping of the chat function in the game terminal 2A is restricted. The transmission of the restriction release instruction is accompanied with an update of the state flag in the terminal data 12b to "−".

The stop of the chat function through the user A's chat stop operation can thus be restricted from the time the message is received until the stop restricting time T or the advanced stop restricting time T−t passes. Described above are the specifics of the processing in the game server 1.

Figure 5:
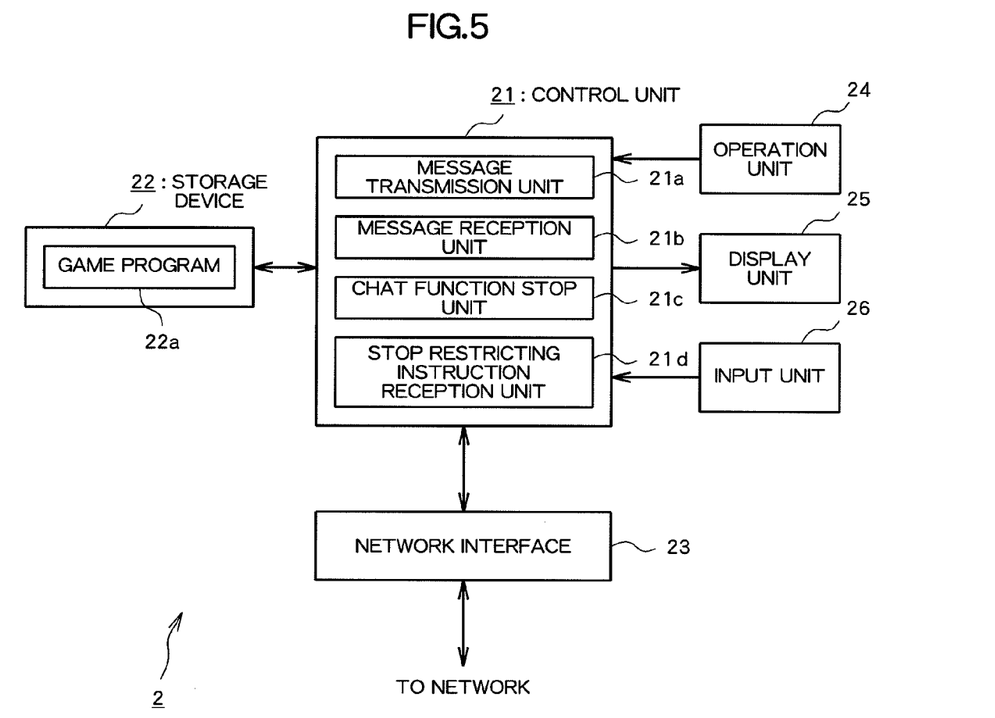
FIG. 5 is a configuration/functional block diagram of a game terminal according to Embodiment 1 of the present invention.

FIG. 5 is a configuration/functional block diagram of the game terminals 2. As shown in FIG. 5, each game terminal 2 includes a control unit 21, a storage device 22, a network interface 23, an operation unit 24 which contains a controller, a keyboard, or the like, a display unit 25 which is a monitor or the like, and an input unit 26 which is a DVD player or the like. The control unit 21 contains functional blocks constituted of a message transmission unit 21a, a message reception unit 21b, a chat function stop unit 21c, and a stop restricting instruction reception unit 21d. These functional blocks are realized by execution of a given game program 22a, which is stored in the storage device 12, on the game terminal 2. The game program 22a may be stored instead in a computer-readable storage medium such as a DVD-ROM.

The control unit 21 including, for example a known CPU, transmits a message input through the operation unit 24 to the game server 1 along with the user ID of a chat partner. The control unit 21 also receives a message transferred from the game server 1 and outputs the message to the display unit 25. In response to the user's chat stop operation, the control unit 21 stops the reception and output of messages transferred by the game server 1. This control unit 21 includes the message transmission unit 21a, the message reception unit 21b, the chat function stop unit 21c, and the stop restricting instruction reception unit 21d as mentioned above. Specific processing of the respective units will be described later.

The storage device 22 includes a known memory such as RAM. The storage device 22 stores the given game program 22a, which is output to the control unit 21. The network interface 23 is a communication device, for example, a known network card. The network interface 23 transmits and receives data over a network.

Now, specific processing of the respective units of the control unit 21 will be described.

The message transmission unit 21a, the message reception unit 21b, the chat function stop unit 21c, and the stop restricting instruction reception unit 21d mainly include a known CPU, and are realized by execution of the given game program 22a. When a message input through the operation unit 24, which is a keyboard, a controller, or the like, is entered by the above-mentioned enter operation such as clicking on the transmit button, the message transmission unit 21a transmits the message to the game server 1 along with the user ID of a chat partner. The message reception unit 21b receives a message transferred by the game server 1, and outputs the message to the chat log field 4 which is output and displayed on the display unit 25. The chat function stop unit 21c executes, in response to an input made by the chat stop operation through the operation unit 24, processing relevant to the stopping of the chat function (chat function stop processing), thus stopping the transferred message reception and output. The stop restricting instruction reception unit 21d receives the above-mentioned restriction instructions and restriction release instruction from the game server 1, and restricts the chat function stop unit 21c from executing the chat function stop processing from the time the restriction instructions are received until the time the restriction release instruction is received. In short, the stop restricting instruction reception unit 21d restricts the chat function stop processing from the time of reception of a message until the elapse of the stop restricting time T or the advanced stop restricting time T−t. Described above are the specifics of the processing in the game terminals 2.

Figure 6:
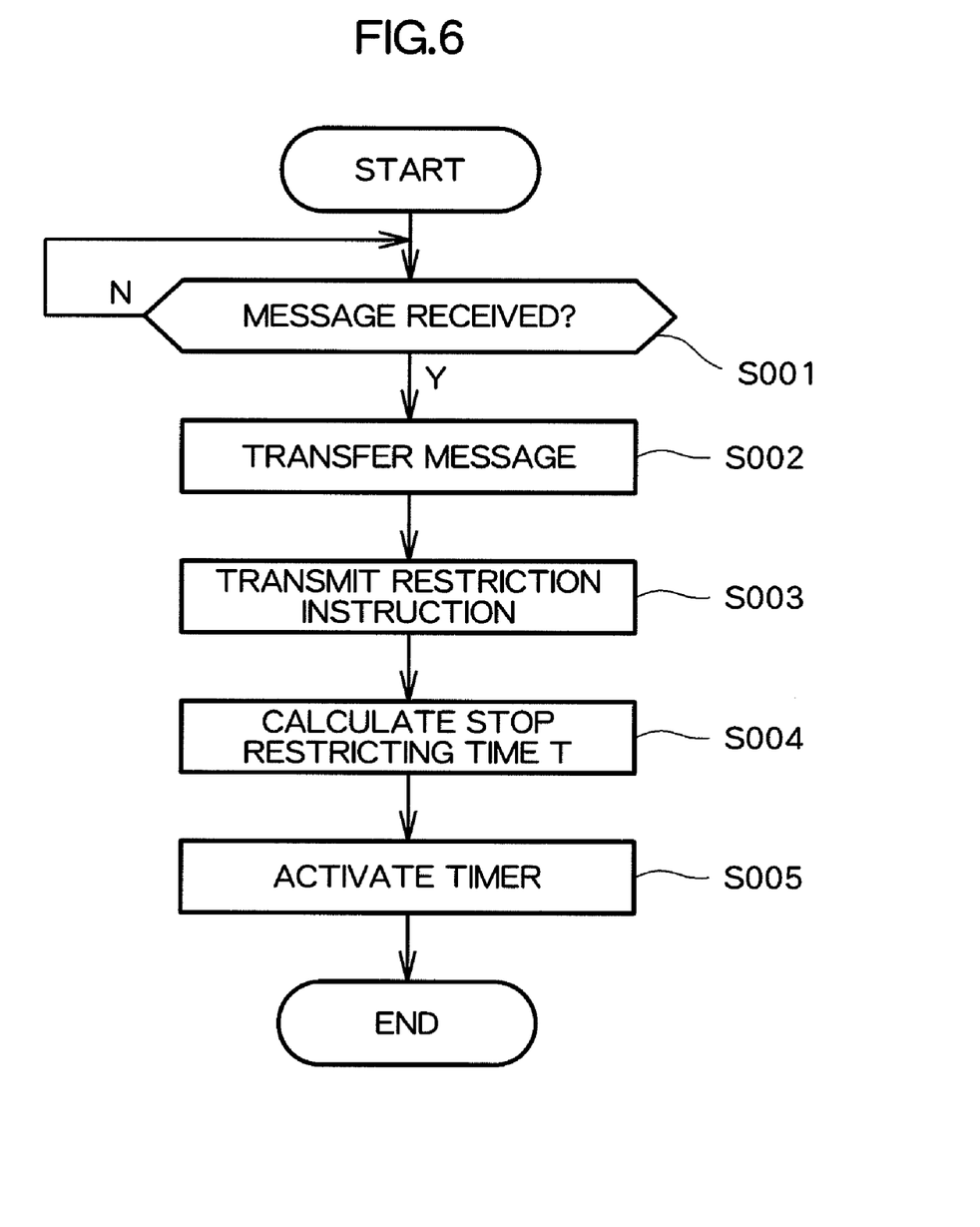
FIG. 6 is a flow chart showing an example of message transfer and chat function stop restricting processing in the game server according to Embodiment 1 of the present invention.

A more detailed description will be next given on the processing of the game server 1. FIG. 6 is an example of a flow chart showing the message transferring processing and the chat function stop restricting processing that are executed on the game server 1. As shown in FIG. 6, the game server 1 monitors for the reception of messages from the game terminals 2 (S001) and, when the message transfer unit 11a receives a message, the message transfer unit 11a refers to the above-mentioned terminal data 12b of FIG. 4 to identify an address associated with the user ID of a chat partner that has been received along with the message, and transfers the message to the game terminal 2 that has the identified address (S002). The steps so far correspond to details of the message transferring processing. Thereafter, the chat function stop restricting processing is started. The stop restriction unit 11e transmits to the game terminal 2 that is the sender of the message the above-mentioned restriction instructions, namely, instructions for restricting the chat function stop unit 21c of this game terminal 2 from executing the chat function stop processing (S003). The stop restricting time calculation unit 11b counts the number of characters of the received message to calculate the stop restricting time T (S004), and updates a state flag that is associated with the message sender game terminal 2 to "+" in the terminal data 12b. The timer unit 11d then activates the timer to measure the elapsed time E since the time of reception of the message by the game server 1 (S005).

Described next is the end timing advancing processing (FIG. 7) that is executed in the game server 1 to advance the end timing of a period in which the stopping of the chat function is restricted. Here, the terminal 2A is in a state where the stopping of the chat function is restricted.

Figure 7:
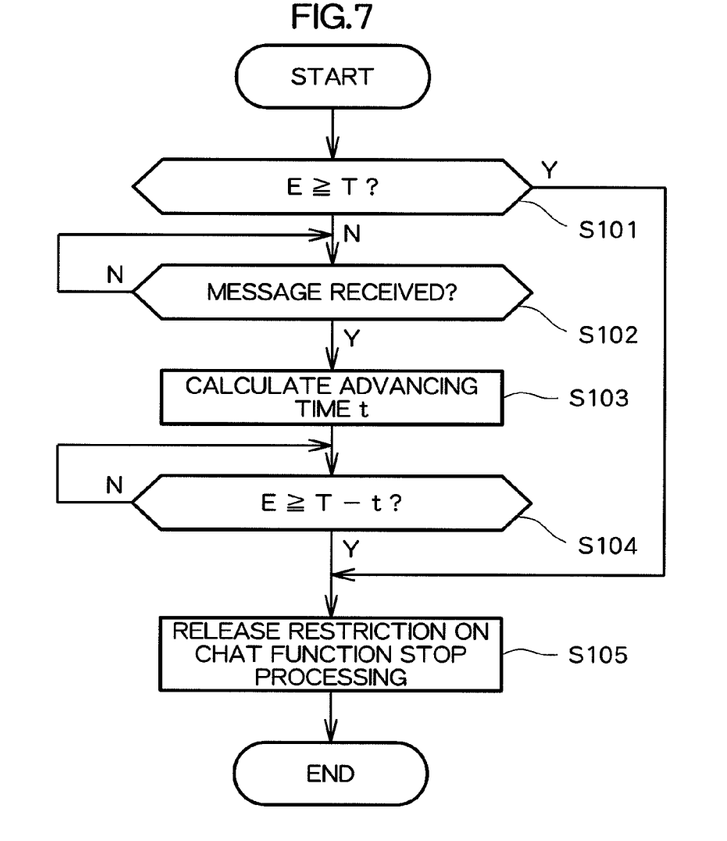
FIG. 7 is a flow chart showing an example of end timing advancing processing in the game server according to Embodiment 1 of the present invention.

As shown in FIG. 7, the stop restriction unit 11e in the game server 1 monitors whether or not the elapsed time E of the game terminal 2A becomes equal to or longer than the stop restricting time T (S101). When the elapsed time E reaches or exceeds the stop restricting time T (Y in S101), the game server 1 transmits the restriction release instruction for canceling the restriction instructions to the game terminal 2A to release the restriction on the chat function stop processing on the game terminal 2A (S105). The transmission of the restriction release instruction is accompanied with an update of the state flag of the terminal data 12b to "−". When the elapsed time E is smaller than the stop restricting time T (N in S101) and the message transfer unit 11a receives a message, the advancing time calculation unit 11c refers the terminal data 12b to check whether or not the game terminal to which the message is directed (here, the game terminal 2A) is being restricted from stopping the chat function. The message transfer unit 11a receives a message directed to the game terminal 2A (Y in S102), and the advancing time calculation unit 11c counts the character count of this message to calculate the advancing time t (S103). The stop restriction unit 11e calculates the advanced stop restricting time T−t, and checks whether or not the elapsed time E is equal to or larger than the advanced stop restricting time T−t (E≧T−t) (S104). In the case where the elapsed time E is equal to or larger than the advanced stop restricting time T−t (Y in S104), S105 is executed immediately. On the other hand, in the case where the elapsed time E is smaller than the advanced stop restricting time T−t (N in S104) S105 is executed at the time when the stop restriction unit 11e confirms that the elapsed time E has reached or exceeded the advanced stop restricting time T−t (Y in S104).

Described above are the message transfer processing, the chat function stop restricting processing, and the end timing advancing processing that are executed by the game server 1. This prevents the restriction on the stopping of the chat function in the game terminal 2 for a user who transmits a message from lasting unduly long, thereby appropriately securing a user who receives the message a chance to transmit a reply message, and making communication between users good. S002 through S005 are executed upon the receipt of a message by the message transfer unit 11a, and do not need to be executed in this order.

Described above are the specifics of an embodiment (Embodiment 1) of the present invention.

Another embodiment (Embodiment 2) of the present invention will be described next. In Embodiment 1, the stop restricting time calculation unit 11b, the advancing time calculation unit 11c, the timer unit 11d, and the stop restriction unit 11e are included in the game server 1, and it is the game server 1 that restricts the stopping of the chat function through the chat stop operation and advances the end timing of a period in which the chat stop operation is restricted. In Embodiment 2, on the other hand, each game terminal 2 has these functions, so the game server 1 executes only the message transfer processing. Embodiment 2 is described below with reference to the drawings. In the following description, the reference symbols used in the Embodiment 1 will be cited for components having the same names.

A chat system according to Embodiment 2 has the same overall configuration as the configuration shown in FIG. 1. A chat system according to Embodiment 2 includes the game terminals 2A and 2B and the game server 1. The user of each game terminal 2 performs a chat by inputting/outputting and transmitting/receiving messages in a chat window such as the one shown in FIG. 2 in Embodiment 1.

Figure 8:
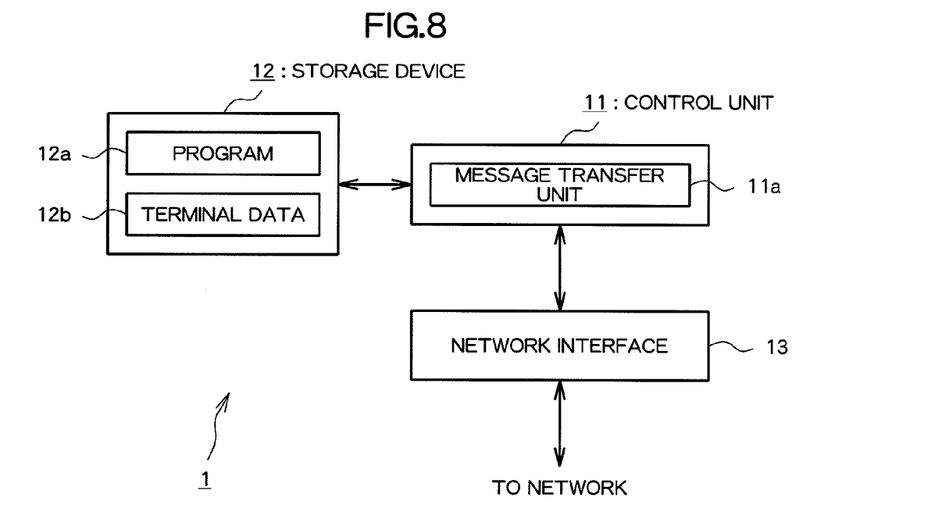
FIG. 8 is a configuration/functional block diagram of a game server according to Embodiment 2 of the present invention.

FIG. 8 is a configuration/functional block diagram of the game server 1. As shown in FIG. 8, the game server 1 includes the control unit 11, the storage device 12, and the network interface 13. The game server 1 may also include a not-shown input/output unit such as a keyboard, a monitor, a DVD player, and the like, and a not-shown information storage medium such as a DVD-ROM or a CD-ROM. The control unit 11 includes a functional block which is a message transfer unit 11a. This functional block is realized by execution of the given program 12a, which is stored in the storage device 12, on the game server 1. The given program 12a may be stored in the computer-readable storage medium mentioned above, such as a DVD-ROM or a CD-ROM.

The control unit 11 includes, for example, a known CPU. The control unit 11 receives a message from one game terminal 2, and identifies the transferring destination of the message to transfer the message to the identified game terminal 2. The control unit 11 includes the functions of the message transfer unit 11a as mentioned above. The message transfer unit 11a mainly includes a known CPU, and is realized by execution of the given program 12a. The message transfer unit 11a receives a message from the game terminal 2A along with the user ID of a chat partner (the user B) through the network interface 13. The message transfer unit 11a refers to the terminal data 12b of FIG. 4 and transfers the message to an address indicated by address data that is associated with the received user ID, namely, the game terminal 2B. The message transfer unit 11a similarly receives a message and the user ID of the user A from the game terminal 2B, and transfers the message to the game terminal 2A.

The storage device 12 in Embodiment 2 stores the program 12a and the terminal data 12b as in Embodiment 1. However, the terminal data 12b in Embodiment 2 does not contain the state flag stored in the terminal data 12b in Embodiment 1. The network interface 13 in Embodiment 2 is the same as the one in Embodiment 1. Described above are the specifics of processing executed by the game server 1 of Embodiment 2.

Figure 9:
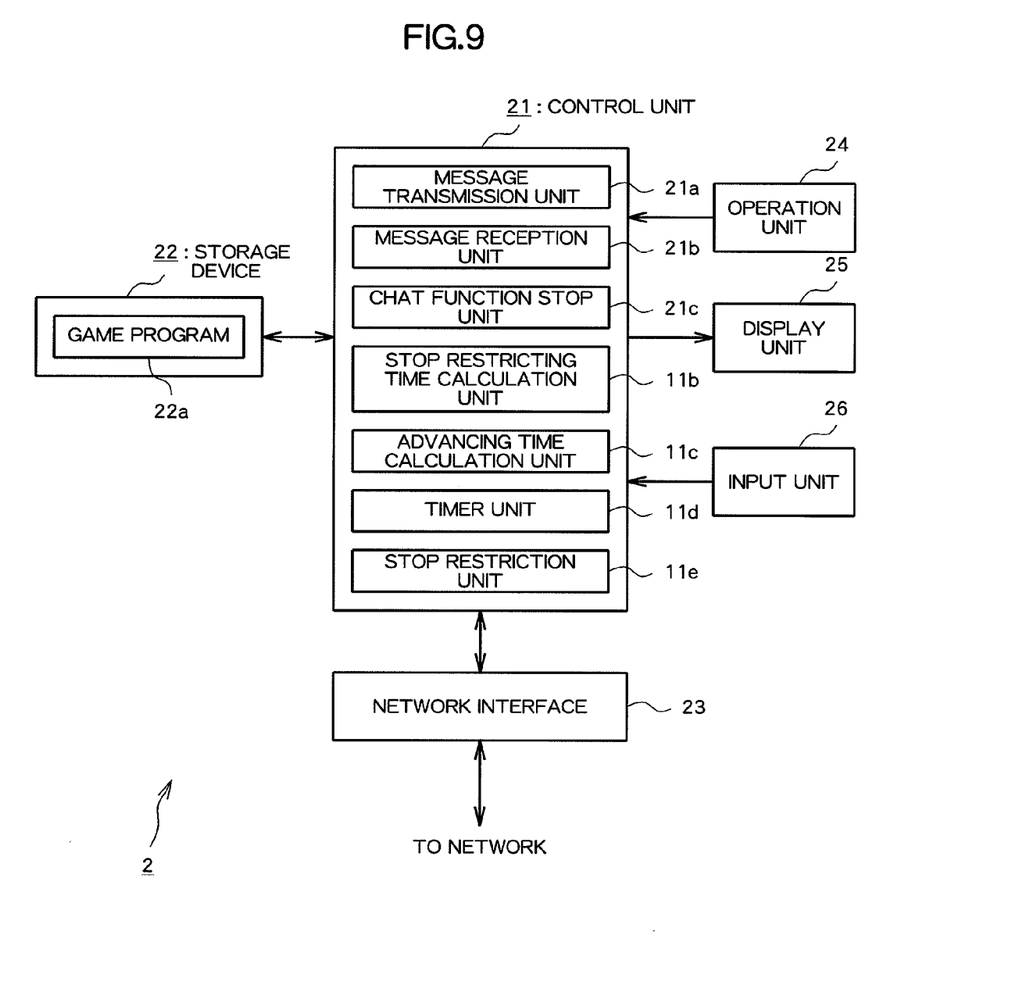
FIG. 9 is a configuration/functional block diagram of a game terminal according to Embodiment 2 of the present invention.

FIG. 9 is a configuration/functional block diagram of the game terminals 2. As shown in FIG. 9, each game terminal 2 includes the control unit 21, the storage device 22, the network interface 23, the operation unit 24 such as a controller, a keyboard, or the like, the display unit 25 such as a monitor or the like, and the input unit 26 such as a DVD player or the like. The control unit 21 includes functional blocks which are the message transmission unit 21a, the message reception unit 21b, the chat function stop unit 21c, the stop restricting time calculation unit 11b, the advancing time calculation unit 11c, the timer unit 11d, and the stop restriction unit 11e. These functional blocks are realized by execution of the given game program 22a, which is stored in the storage device 22, on the game terminal 2. The given game program 22a may be stored instead in a computer-readable storage medium such as a DVD-ROM. In this case, the respective units other than the control unit 21 are the same as those in Embodiment 1.

The control unit 21 includes, for example, a known CPU. The control unit 21 transmits a message input through the operation unit 24 to the game server 1 along with the user ID of a chat partner. The control unit 21 receives from the game server 1 a transferred message, which is output to the display unit 25. The control unit 21 also stops the reception and output of messages transferred by the game server 1 in response to the user's chat stop operation. This control unit 21 includes, as mentioned above, the message transmission unit 21a, the message reception unit 21b, the chat function stop unit 21c, the stop restricting time calculation unit 11b, the advancing time calculation unit 11c, the timer unit 11d, and the stop restriction unit 11e.

The message transmission unit 21a, the message reception unit 21b, the chat function stop unit 21c, the stop restricting time calculation unit 11b, the advancing time calculation unit 11c, the timer unit 11d, and the stop restriction unit 11e mainly include a known CPU, and are realized by execution of the given game program 22a. When a message input through the operation unit 24 such as a keyboard, a controller, or the like, is entered by the above-mentioned enter operation such as clicking on the transmit button, the message transmission unit 21a transmits the message to the game server 1 along with the user ID of a chat partner. The message reception unit 21b receives a message transferred by the game server 1, and outputs the message to the chat log field 4 on the display unit 25. The chat function stop unit 21c executes, in response to an input made by the chat stop operation through the operation unit 24, processing relevant to the stopping of the chat function (chat function stop processing), thus stopping the message reception and output transferred to this game terminal 2.

The stop restricting time calculation unit 11b counts the character count of a message transmitted by the message transmission unit 21a, and calculates the stop restricting time T in accordance with the character count.

In the case where the message reception unit 21b receives a message during a period in which this game terminal 2 is restricted from stopping the chat function, the advancing time calculation unit 11c calculates the advancing time t by which the end timing of this period is advanced.

The timer unit 11d measures the elapsed time E since the start time of the period in which the stopping of the chat function is restricted. In other words, the timer unit 11d measures the elapsed time E since the time at which the message transmission unit 21a transmits a message.

When the message transmission unit 21a transmits a message, the stop restriction unit 11e restricts the chat function stop processing, which is executed by the chat function stop unit 21c in response to the user's chat stop operation, in other words, processing for stopping the message reception and output. The stop restriction unit 11e releases the restriction on the chat function stop processing as the elapsed time E becomes equal to or longer than the stop restricting time T. The stop restriction unit 11e releases the restriction on the chat function stop processing as the elapsed time E becomes equal to or longer than the advanced stop restricting time T−t, similar to the case where the message reception unit 21b receives a message during the period in which the stop of the chat function is restricted. Described above are the specifics of the processing in the game terminals 2.

Figure 10:
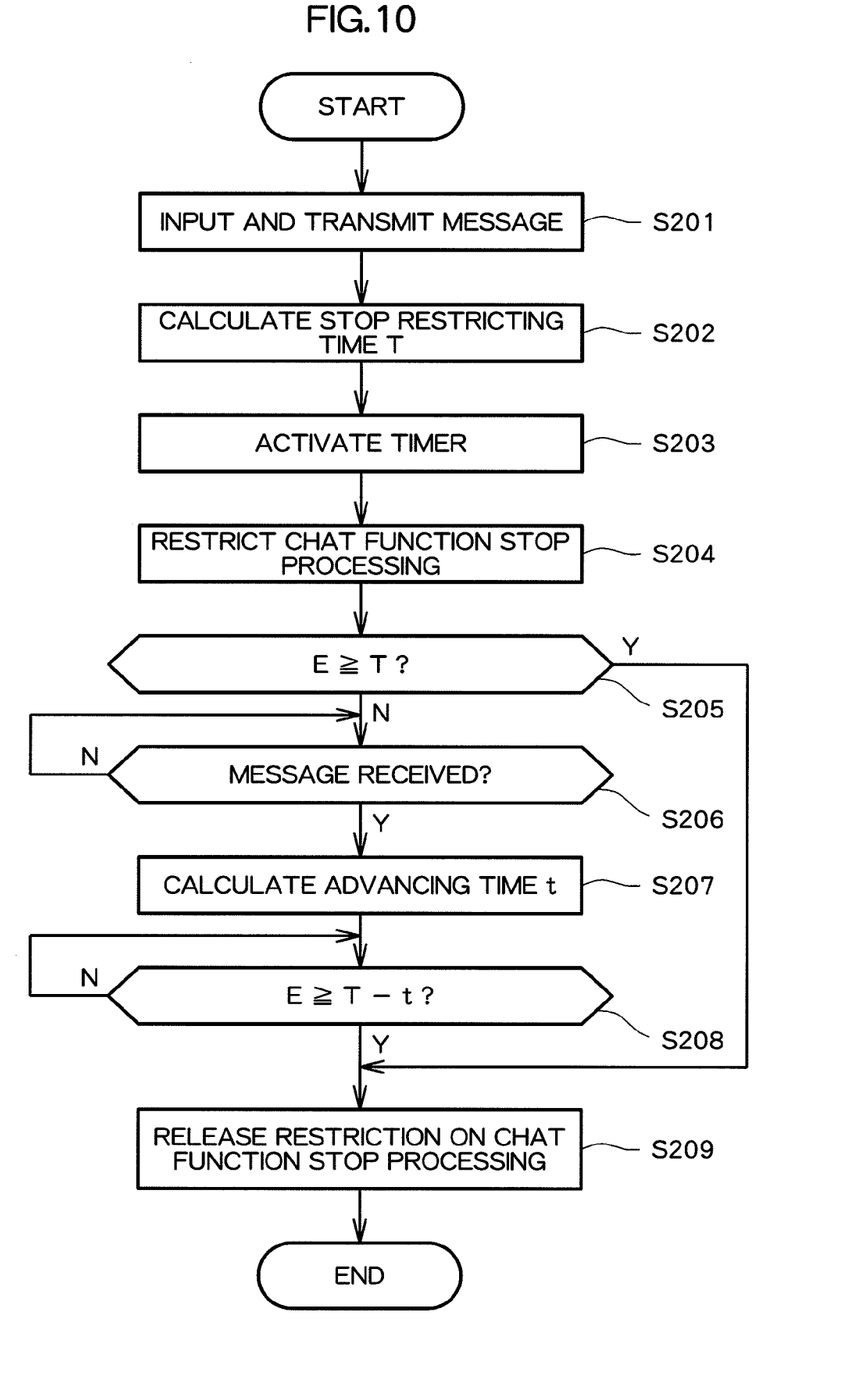
FIG. 10 is a flow chart showing an example of message transmission, chat function stop restricting processing, and end timing advancing processing in the game terminal according to Embodiment 2 of the present invention.

A more detailed description will next be given on the processing of the game terminals 2. FIG. 10 is an example of a flow chart showing the message transmitting processing, the chat function stop restricting processing, and the end timing advancing processing that are executed on the game terminals 2. As shown in FIG. 10, the message transmission unit 21a transmits a message input by the user in response to the enter operation, such as clicking on the send button of FIG. 2 (S201). The steps so far correspond to the message transmitting processing. The chat function stop restricting processing is then started. The stop restricting time calculation unit 11b counts the character count of the transmitted message and calculates the stop restricting time T (S202). The timer unit 11d then activates the timer to measure the elapsed time E from the time when the message was transmitted (S203). After the message is transmitted, the stop restriction unit 11e restricts the chat function stop restricting processing, which is executed by the chat function stop unit 21c in response to the user's chat stop operation (S204).

The end timing advancing processing is then started. The stop restriction unit 11e monitors whether or not the elapsed time E becomes equal to or longer than the stop restricting time T (S205) and, when the elapsed time E reaches or exceeds the stop restricting time T (Y in S205), releases the restriction on the chat function stop processing (S209). When the elapsed time E is smaller than the stop restricting time T (N in S205) and the message reception unit 21b receives a message (Y in S206), the advancing time calculation unit 11c counts the character count of this message to calculate the advancing time t (S207). The stop restriction unit 11e then calculates the advanced stop restricting time T−t and checks whether or not the elapsed time E is equal to or larger than the advanced stop restricting time T−t (E≧T−t) (S208). In the case where the elapsed time E is equal to or larger than the advanced stop restricting time T−t (Y in S208), S209 is executed immediately. In the case where the elapsed time E is smaller than the advanced stop restricting time T−t (N in S208), on the other hand, S209 is executed at the time when the stop restriction unit 11e confirms that the elapsed time E has reached or exceeded the advanced stop restricting time T−t (Y in S208).

Described above are the message transmitting processing, the chat function stop restricting processing, and the end timing advancing processing that are executed by the game terminals 2. S202 through S204 are executed in response to the transmission of a message by the message transmission unit 21a, and do not need to be executed in this order.

As has been described, according to Embodiments 1 and 2, the restriction put on a user's freedom to stop the chat function after the user transmits a message is prevented from lasting unduly long, while appropriately securing a user who receives the message a chance to transmit a reply message and making communication between users good. In Embodiment 2, in particular, where each game terminal 2 executes the chat function stop restricting processing and the end timing advancing processing, the load on the game server 1 is lightened. Described above are the specifics of Embodiment 2.

The present invention is not limited to what is described in the above embodiments.

The number of users who performs a chat is not limited to 2. In other words, the present invention applies to an embodiment in which the game server 1 is communicatively connected to a plurality of game terminals 2 via the network, and the game server 1 transfers messages transmitted by a given game terminal 2 to the rest of the plurality of game terminals. In other words, the present invention is applicable to a so-called conference-style chat or the like. As in Embodiments 1 and 2, this embodiment can also prevent the restriction put on a user's freedom to stop the chat function after the user transmits a message from lasting unduly long, while appropriately securing a user who receives the message a chance to transmit a reply message.

In Embodiments 1 and 2 the game terminals 2 and the game server 1 are used as devices that constitute a chat system. Alternatively, general communication devices such as personal computers and personal digital assistants may be used instead of the game terminals 2 and a known general server computer may be used instead of the game server 1. With this configuration, the chat may be performed in different situations from online gaming. In other words, the present invention can be applicable to a general chat that is performed with personal computers as chat devices and a server computer serving as the chat server.

While a server device such as the game server 1 relays messages between client devices such as the game terminals 2 here, the present invention may be applied to an embodiment in which the respective client devices form a so-called peer-to-peer network to perform direct communication with each other. This is realized by causing each of the client devices to execute the chat function stop restricting processing and the end timing advancing processing by itself as the game terminal 2 does in Embodiment 2.

The stop restricting time and the advancing time may be set irrespective of the character count of a message. For instance, the time required to input a transmitted message and the time required to input a reply message may be used as the stop restricting time and the advancing time, respectively.

In S101 and S205, whether or not the elapsed time E has become equal to or larger than the stop restricting time T may be judged by judging whether or not a value obtained by subtracting T from E is equal to or larger than 0 (E−T≧0). Similarly, in S104 and S208, whether or not the elapsed time E has become equal to or larger than the advanced stop restricting time T−t may be judged by judging whether or not a value obtained by subtracting T−t from E is equal to or larger than 0 (E−T+t≧0).

The invention claimed is:

1. A chat system including a first chat device and a second chat device each including:
    message input means through which a user inputs a message;
    message transmission means which transmits a message input through the message input means;
    message reception means which receives a message;
    message output means which outputs the message received by the message reception means; and
    message reception/output stop means which stops the message reception and output by the message reception means and the message output means in response to a given operation by the user,
    the chat system comprising:
    chat stop restricting time calculation means which calculates a chat stop restricting time based on contents of a message that is transmitted from the message transmission means in the first chat device;
    stop restriction means which restricts the message reception/output stop means from stopping the message reception and output in the first chat device in response to the user's given operation for a period corresponding to the calculated chat stop restricting time; and
    end timing advancing means which, when the second chat device transmits a message directed to the first chat device during the period, advances an end timing of the period based on the contents of the message,
    wherein when the second chat device transmits the message directed to the first chat device during the period and when an elapsed time is smaller than the chat stop restricting time, the end timing advancing means calculates an advancing time for advancing the end timing of the period.

2. A chat system as claimed in claim 1, further comprising timer means which measures the passage of the period.

3. A chat system as claimed in claim 1, wherein the stop restriction means, the chat stop restricting time calculation means, and the end timing advancing means are provided in the first chat device and the second chat device each.

4. A chat system as claimed in claim 1, further comprising a chat server which transfers a message transmitted from the first chat device to the second chat device, and also transfers a message transmitted from the second chat device to the first chat device,
  wherein the stop restriction means, the chat stop restricting time calculation means, and the end timing advancing means are provided in the chat server.

5. A chat system as claimed in claim 4, wherein the first chat device and the second chat device are video game terminals, and the chat server is a video game server.

6. A chat system as claimed in claim 1, wherein a time required to input the message that is transmitted from the first chat device is used in the calculation of the chat stop restricting time.

7. A chat system as claimed in claim 1, wherein a time required to input the message that is transmitted from the second chat device is used in advancing the end timing.

8. A chat system as claimed in claim 1, wherein the end timing advancing means calculates the advancing time based on a number of character of the message transmitted by the second chat device.

9. A chat system as claimed in claim 1, wherein the advancing the end timing of the period corresponds to reducing the length of the period corresponding to the calculated chat stop restricting time.

10. A chat system as claimed in claim 1, wherein the stop restriction means calculates an advanced chat stop restricting time by subtracting the chat stop restricting time with the advancing time.

11. A method of controlling chat devices for use in a chat system, comprising the steps of:
  inputting a message;
  transmitting the input message;
  receiving a message;
  outputting the received message;
  stopping the message reception and output in response to a given operation by a user;
  calculating a chat stop restricting time based on contents of a transmitted message;
  restricting the message reception and output from being stopped in response to the user's given operation for a period corresponding to the calculated chat stop restricting time; and
  when a message is received during the period, advancing an end timing of the period based on the contents of the message,
  wherein when the message is received during the period and when an elapsed time is smaller than the calculated chat stop restricting time, an advancing time for advancing the end timing of the period is calculated.

12. A method of controlling a chat server for use in a chat system including a first chat device and a second chat device, comprising the steps of:
  receiving a message that is transmitted from the first chat device;
  transferring the received message to the second chat device;
  receiving a message that is transmitted from the second chat device;
  transferring the received message to the first chat device;
  calculating a chat stop restricting time based on contents of a message that is transmitted from the first chat device;
  restricting the first chat device from stopping the message reception and output for a period corresponding to the calculated chat stop restricting time; and
  when a message directed to the first chat device is received during the period, advancing an end timing of the period based on the contents of the message,
  wherein when the message directed to the first chat device is received during the period and when an elapsed time is smaller than the calculated chat stop restricting time, an advancing time for advancing the end timing of the period is calculated.

13. A computer-readable memory storing a program which causes a computer to function as:
  message input means through which a message is input;
  message transmission means which transmits the input message;
  message reception means which receives a message;
  message output means which outputs the received message;
  message reception/output stop means which stops the message reception and output in response to a given operation by a user;
  chat stop restricting time calculation means which calculates a chat stop restricting time based on contents of a message that is transmitted by the message transmission means;
  stop restriction means which restricts the message reception/output stop means from stopping the message reception and output in response to the user's given operation for a period corresponding to the calculated chat stop restricting time; and
  end timing advancing means which, when a message is received during the period, advances an end timing of the period based on the contents of the message,
  wherein when the message is received during the period and when an elapsed time is smaller than the calculated chat stop restricting time, the end timing advancing means calculates an advancing time for advancing the end timing of the period.

14. A computer-readable memory storing a program which causes a computer for use in a chat system including a first computer and a second computer to function as:
  message reception means which receives messages transmitted from the first computer and the second computer;
  message transfer means which transfers a message transmitted from the first computer to the second computer and transfers a message transmitted from the second computer to the first computer;
  chat stop restricting time calculation means which calculates a chat stop restricting time based on a message that is transmitted from the first computer;
  stop restriction means which restricts the reception and output of messages from being stopped in the first computer for a period corresponding to the calculated chat stop restricting time; and
  end timing advancing means which, when a message directed to the first computer is received during the period, advances an end timing of the period based on contents of the message,
  wherein when the message directed to the first computer is received during the period and when an elapsed time is smaller than the chat stop restricting time, the end timing advancing means calculates an advancing time for advancing the end timing of the period.

* * * * *